US010897709B2

(12) United States Patent
Nagarajamoorthy et al.

(10) Patent No.: US 10,897,709 B2
(45) Date of Patent: Jan. 19, 2021

(54) WIRELESS NETWORK AUTHORIZATION USING A TRUSTED AUTHENTICATOR

(71) Applicant: ARRIS Enterprises LLC, Suwanee, GA (US)

(72) Inventors: Karthick Somalinga Nagarajamoorthy, Bangalore (IN); Somesh Saraf, Bangalore (IN); Sudeepta Bhuyan, Bangalore (IN); Epari Aurovind Sagar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 54 days.

(21) Appl. No.: 15/374,673

(22) Filed: Dec. 9, 2016

(65) Prior Publication Data
US 2018/0167812 A1 Jun. 14, 2018

(51) Int. Cl.
*H04L 29/06* (2006.01)
*H04W 12/06* (2009.01)
*H04W 4/021* (2018.01)
*H04B 17/318* (2015.01)
(Continued)

(52) U.S. Cl.
CPC .......... *H04W 12/06* (2013.01); *H04B 17/318* (2015.01); *H04L 9/0861* (2013.01);
(Continued)

(58) Field of Classification Search
CPC . H04B 17/318; H04L 63/0428; H04L 63/062; H04L 63/083; H04L 63/107;
(Continued)

(56) References Cited

U.S. PATENT DOCUMENTS 8,494,576 B1 * 7/2013 Bye .................... G07C 9/00087
455/550.1
9,232,400 B2 1/2016 Singh et al.
(Continued)

FOREIGN PATENT DOCUMENTS

EP 1720370 A1 11/2006

OTHER PUBLICATIONS

"What is a CSR" (SSLShopper Sep. 6, 2015).*
PCT International Search Report, RE: Application No. PCT/US2017/062625, dated Jan. 29, 2018.

*Primary Examiner* — J. Brant Murphy
*Assistant Examiner* — Ka Shan Choy
(74) *Attorney, Agent, or Firm* — Thomas A. Ward

(57) ABSTRACT

A method of granting access to a wireless network is provided allowing approval by a trusted authenticator. The method includes receiving a request to join a wireless network at a gateway from a client device, determining with the gateway whether the client device is within a predefined trusted zone, sending a notification of a potential new connection with the client device from the gateway to the trusted authenticator. The trusted authenticator then provides a response regarding the potential new connection, wherein the gateway denies network access to the client device when the gateway determines that the client device is outside the trusted zone or when the response from the trusted authenticator rejects the potential new connection, and wherein the gateway grants network access to the client device when the gateway determines that the client device is inside the trusted zone and when the response from the trusted authenticator approves the potential new connection.

7 Claims, 8 Drawing Sheets

(51) Int. Cl.
| | |
|---|---|
| *H04L 9/32* | (2006.01) |
| *H04L 9/08* | (2006.01) |
| *H04W 12/08* | (2009.01) |
| *H04W 76/14* | (2018.01) |
| *H04W 4/80* | (2018.01) |
| *H04W 12/00* | (2009.01) |
| *H04W 84/12* | (2009.01) |

(52) U.S. Cl.
CPC ........ *H04L 9/3268* (2013.01); *H04L 63/0428* (2013.01); *H04L 63/062* (2013.01); *H04L 63/083* (2013.01); *H04L 63/107* (2013.01); *H04W 4/021* (2013.01); *H04W 4/80* (2018.02); *H04W 12/003* (2019.01); *H04W 12/08* (2013.01); *H04W 76/14* (2018.02); *H04L 63/0823* (2013.01); *H04W 12/00503* (2019.01); *H04W 84/12* (2013.01)

(58) Field of Classification Search
CPC ..... H04L 9/0861; H04L 9/3268; H04L 63/10; H04W 12/06; H04W 12/08; H04W 4/021; H04W 4/80; H04W 76/14
See application file for complete search history.

(56) References Cited

U.S. PATENT DOCUMENTS

| | | | |
|---|---|---|---|
| 2004/0203748 A1* | 10/2004 | Kappes | H04L 12/2856 455/432.1 |
| 2004/0255037 A1 | 12/2004 | Corvari et al. | |
| 2005/0213519 A1* | 9/2005 | Relan | G06F 21/43 370/277 |
| 2007/0143851 A1* | 6/2007 | Nicodemus | G06F 11/3495 726/25 |
| 2009/0031410 A1* | 1/2009 | Schneider | H04L 63/0823 726/10 |
| 2013/0073856 A1 | 3/2013 | Sherkin et al. | |
| 2013/0309971 A1 | 11/2013 | Kiukkonen et al. | |
| 2015/0223063 A1 | 8/2015 | Hong et al. | |
| 2015/0319730 A1* | 11/2015 | Seine | H04W 64/003 370/338 |
| 2016/0344561 A1* | 11/2016 | Grajek | H04L 9/3268 |
| 2017/0163629 A1* | 6/2017 | Law | H04L 9/3247 |
| 2017/0200151 A1* | 7/2017 | Bruno | G06Q 20/363 |
| 2018/0034822 A1* | 2/2018 | Mistry | H04L 63/101 |

* cited by examiner

WIRELESS NETWORK AUTHORIZATION USING A TRUSTED AUTHENTICATOR

TECHNICAL FIELD

The present disclosure relates to the field of wireless networking, particularly a method of authorizing new devices to join an existing network.

BACKGROUND

Wireless networking has allowed an increasing number of devices to join the same local area network in a home, business, school, or other location. For example, a single home can have computers, smartphones, tablet computers, gaming consoles, televisions, set-top boxes, media streaming devices, Internet-connected appliances, IP security cameras, and other devices connected to a single Wi-Fi router.

With multiple devices connected to a single Wi-Fi router that may access it at any time of day, many Wi-Fi routers are kept on and active at all times. Unfortunately, doing so can increase the chances unauthorized users have to hack into the router and use the Wi-Fi network. For example, unauthorized users can access a Wi-Fi network to access sensitive files or download pirated movies or other large files. Such activity can impact the privacy of the network's owner, and/or take up bandwidth on the network, thereby costing the network owner money.

Wi-Fi networks are often protected with passwords. However, unauthorized users who guess or gain access to a legitimate password can often join a Wi-Fi network and abuse it without the network owner's knowledge. For example, a hacker can use brute force methods to try numerous passwords until one works, and then use the network for their own purposes. As another example, hackers can use social engineering to trick legitimate users into providing their Wi-Fi passwords. While Wi-Fi passwords can be reset periodically to improve security, most home users do not do so regularly because the new password must be entered into all of their connected devices.

In other cases Wi-Fi networks can be protected with stronger enterprise-level security, such as WPA-802.1x, that requires the connecting device to be provisioned with a digital certificate. However, conventional processes for provisioning new devices with such digital certificates can be complex and beyond many home users. They can also be difficult to do quickly to establish temporary connections, such as when a guest comes over and wants to join their smartphone to the home's Wi-Fi network. As such, most home users are unlikely to use such stronger methods of protecting their Wi-Fi networks.

Even if home users were more likely to secure their Wi-Fi networks using digital certificates, many existing provisioning systems use a server to send a digital certificate to the new client device along with a private key.

Although the private key can be obfuscated and then stored in relatively secure data location in the client device, the private key is still exposed as it is transported over the network.

SUMMARY

What is needed is a new system and method for approving or denying new connections to a Wi-Fi network.

In one embodiment the present disclosure provides method of granting access to a wireless network, provides a method of granting access to a wireless network, the method comprising receiving a request to join a wireless network at a gateway from a client device, determining with the gateway whether the client device is within a predefined trusted zone, sending a notification of a potential new connection with the client device from the gateway to a trusted authenticator connected to the wireless network, and receiving a response from the trusted authenticator regarding the potential new connection, wherein the gateway denies network access to the client device when the gateway determines that the client device is outside the trusted zone or when the response from the trusted authenticator rejects the potential new connection, and wherein the gateway grants network access to the client device when the gateway determines that the client device is inside the trusted zone and when the response from the trusted authenticator approves the potential new connection.

In another embodiment the present disclosure provides method of granting access to a wireless network, the comprising pairing a trusted authenticator directly with a client device over a direct connection, wherein the trusted authenticator is connected to a gateway over a wireless network and is loaded with trusted zone information defining boundaries of a predefined trusted zone associated with the gateway, determining with the trusted authenticator whether the client device is within the trusted zone based on the trusted zone information, and denying the client device access to the wireless network when the client device is outside the trusted zone, sending a certificate signing request (CSR) request message from the trusted authenticator to the client device, the CSR request message defining a key pair generation algorithm, receiving a CSR at the trusted authenticator from the client device in response to the CSR request message, the CSR comprising a public key generated by the client device according to the key pair generation algorithm, sending the CSR from the trusted authenticator to the gateway in an enrollment request message, receiving a digital certificate from the gateway at the trusted authenticator in response to the enrollment request message, wherein the gateway generated a digital certificate based on the CSR and encrypted the digital certificate using the public key in the CSR, and providing the digital certificate from the trusted authenticator to the client device such that the client device decrypts the digital certificate using a private key generated at the client device according to the key pair generation algorithm and provides the digital certificate to an authentication server at the gateway to join the wireless network.

BRIEF DESCRIPTION OF THE DRAWINGS

Further details of the present invention are explained with the help of the attached drawings in which.

DETAILED DESCRIPTION

Figure 1:
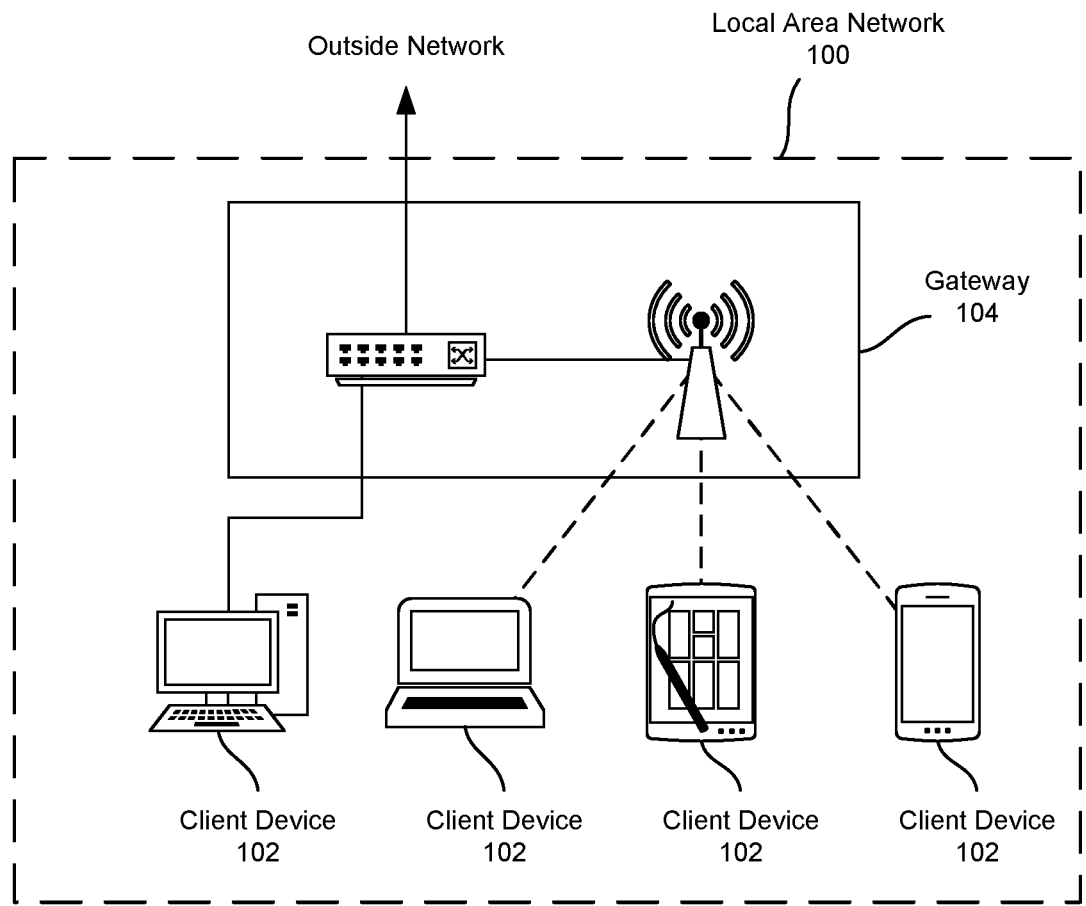
FIG. 1 depicts an exemplary local area network (LAN).

FIG. 1 depicts a non-limiting example of a local area network (LAN) 100. A LAN 100 can comprise one or more client devices 102 connected to a gateway 104.

A client device 102 can be a device that can connect to a LAN 100 to send and/or receive data with other devices using one or more communication protocols, such as communications using the Internet Protocol (IP).

By way of non-limiting examples, client devices 102 can be computers, smartphones, tablet computers, gaming consoles, televisions, set-top boxes, media streaming devices, Internet-connected appliances, IP security cameras, or any other type of device that can be connected to a LAN 100.

A gateway 104 can connect the client devices 102 in the LAN 100 to each other and/or to another network. By way of a non-limiting example, a gateway 104 can connect client devices 102 to a service provider's network that itself connects to the Internet, such that the client devices 102 in the LAN 100 can access the Internet via the gateway 104.

A gateway 104 can comprise a modem, router, wireless access point, and/or other elements that are configured to transmit data between network elements using communications protocols. In some embodiments some or all elements of the gateway 104 can be separated into different devices, such as a standalone modem that connects to a separate wireless router. In other embodiments elements of the gateway 104 can be combined into a single device, such as a device that incorporates a cable modem directly with a wireless router.

Client devices 102 can connect to the gateway 104 over a wired and/or wireless connection. By way of a non-limiting example, a client device 102 can be connected to the gateway 104 with a wired connection using an Ethernet cable. By way of another non-limiting example, a client device 102 can be connected to the gateway 104 wirelessly using a Wi-Fi connection.

Wireless connections between a client device 102 and the gateway 104 can be secured using network credentials such as keys, passphrases, and/or digital certificates. Client devices that are not connected to the LAN 100 can receive a Wi-Fi signal from the gateway 104 through which they can attempt to join the LAN 100 by providing such network credentials to the gateway 104. Client devices 102 that have invalid network credentials can be denied access to the LAN 100.

By way of a non-limiting example, key-based security protocols include WEP (Wired Equivalent Privacy), WPA (Wi-Fi Protected Access), and WPA2 (Wi-Fi Protected Access II). In many such key-based security protocols, the client device 102 sends a key of hexadecimal values that was either inputted directly or translated from a passphrase of ASCII characters. If the gateway 104 validates the key, the client device 102 can be allowed to access the LAN 100 if approved by a trusted authenticator 202 as described below.

By way of another non-limiting example, WPA-802.1x is a security protocol that uses a digital certificate held by a client device 102 that can be authenticated using EAP-TLS (Extensible Authentication Protocol-Transport Layer Security). In such embodiments the gateway 104 can comprise an authentication server, such as a Remote Authentication Dial-In User Service (RADIUS) server, that is configured to grant or deny client devices 102 access to the LAN based on digital certificates provided by the client devices 102. As such, if the authentication server validates a digital certificate provided by a client device 102, the client device 102 can be allowed to access the LAN 100 if approved by a trusted authenticator 202 as described below.

Figure 2:
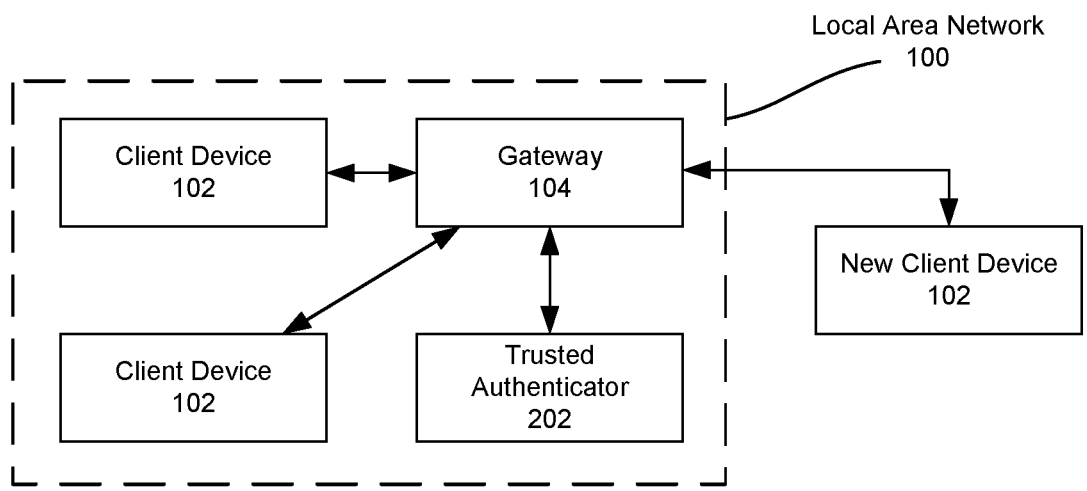
FIG. 2 depicts an embodiment in which a client device connected to a LAN has been designated as a trusted authenticator.

FIG. 2 depicts an embodiment in which a client device 102 connected to a LAN 100 has been designated as a trusted authenticator 202. One or more client devices 102 connected to a LAN 100 can be designated as trusted authenticators 202. By way of a non-limiting example, a trusted authenticator 202 can be a smartphone that is already connected to a LAN 100.

A trusted authenticator 202 can at least partially control other client devices' access to the LAN 100, such as assisting in granting or denying network access to a new client device 102 that attempts to join the LAN 100, or by approving or denying network access to a client device 102 that is already connected to the LAN 100.

In some embodiments trusted authenticators 202 can also view information about other client devices connected to the LAN 100, such as their device type, their name and/or nickname, information about their proximity to the gateway 104 or other devices, whether or not they have also been designated as a trusted authenticator 202, and/or unique identifiers for the devices such as MAC addresses or IP addresses. In some embodiments the gateway 104 can provide such information about new client devices 102 to the trusted authenticators 202 when the new client devices 102 are approved and are granted access to the LAN 100, or at any other time.

A client device 102 connected to the LAN 100 can be designated as a trusted authenticator 202 using an enrollment process. In some embodiments a username, password, and/or other credentials can be input into a client device 102 via an application or settings menu, and the credentials can be sent to the gateway 104 such that it can verify the credentials and enroll the client device 102 as a trusted authenticator in the LAN 100. In other embodiments, an application or settings menu at the gateway 104 can be used designate specific client devices 102 that are already connected to the gateway 104 as trusted authenticators 202. In some embodiments the gateway 104 can track a unique identifier for each enrolled trusted authenticator 202, such as a MAC address or IP address, such that the gateway 104 can identify which connected client devices 102 have been designated as trusted authenticators 202 in the LAN 100.

In some embodiments, when a trusted authenticator 202 is disconnected from the LAN 100 for a predetermined period of time, it can be disenrolled from being a trusted authenticator 202. If desired, disenrolled trusted authenticators 202 can connect to the LAN 100 as normal client devices 102 and then be re-enrolled as trusted authenticators 202 through the enrollment process. In alternate embodiments client devices 102 can remain enrolled as trusted authenticators 204 when they are not connected directly to the LAN 100. By way of a non-limiting example, when a smartphone is designated as a trusted authenticator 202 for a home's LAN 100, in some embodiments the gateway 104 can communicate with the smartphone over a general internet connection available to the smartphone via cellular data when the smartphone is away from the home LAN 100, such that the smartphone can remotely be used to control other client devices' access to the home LAN 100.

Figure 3:
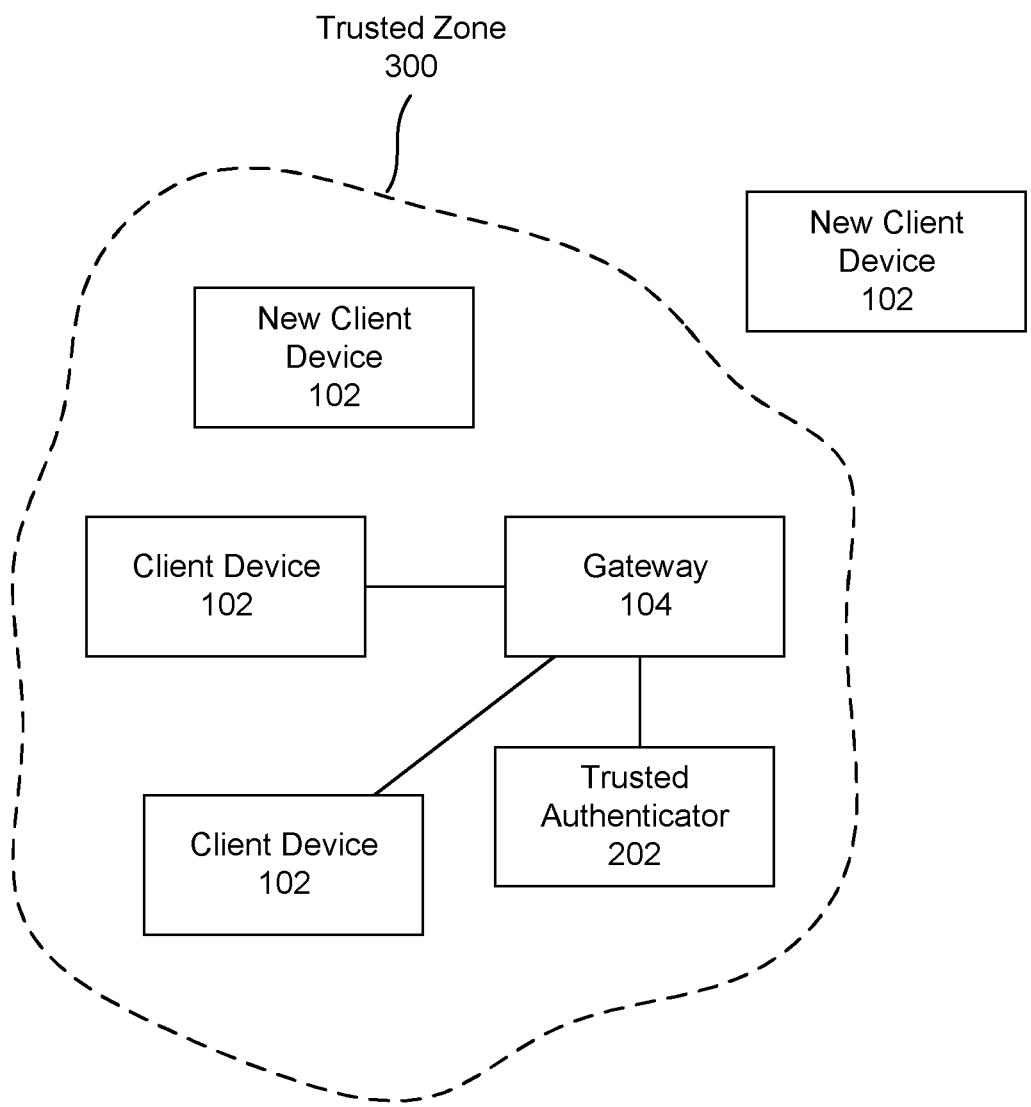
FIG. 3 depicts an embodiment of a trusted zone.

FIG. 3 depicts an embodiment of a trusted zone 300. A trusted zone 300 can be a physical area that is within range of Wi-Fi signals broadcast by the gateway 104. The boundaries of the trusted zone 300 can be known to the gateway 104 and/or trusted authenticators 202, such that the physical location of a client device 102 can be reviewed to determine whether the client device 102 is inside or outside the trusted zone 300. As such, in some embodiment client devices 102 inside the trusted zone 300 can be treated differently by the gateway 104 and/or trusted authenticators 202 than client devices 102 outside the trusted zone 300. By way of a non-limiting example, when the boundaries of a trusted zone 300 substantially match the physical boundaries of a house, in some embodiments client devices 102 outside the house can be subject to more stringent security checks before they can join the LAN 100 than client devices 102 inside the home. By way of another non-limiting example, in some embodiments client devices 102 outside the trusted zone 300 can be denied access to the LAN 100, while client devices 102 inside the trusted zone 300 can be granted access to the LAN 100 if approved by a trusted authenticator 202 as described below.

In some embodiments the boundaries of the trusted zone 300 can be determined through physical coordinates, such as latitude, longitude, and/or altitude coordinates. In such embodiments, the trusted zone 300 can be set up by physically moving a mobile location-aware device around the desired boundaries of the trusted zone 300 and periodically reporting the coordinates of its location to the gateway 104. By way of a non-limiting example, a field engineer, customer, or other user can carry a client device 102, such as a trusted authenticator 202 or other specialized client device 102, around the edges of a desired trusted zone 300. As the client device 102 is moved around the boundaries of the trusted zone 300, it can periodically report the physical coordinates of its location to the gateway 104 using Location Configuration Information (LCI) according to 802.11k or another wireless protocol. The gateway 104 can thus store reported coordinates by the mobile location-aware device as positions that are along the boundaries of the trusted zone 300. In some embodiments the gateway 104 can share the boundaries of its trusted zone 300 with trusted authenticators 202.

In other embodiments the boundaries of the trusted zone 300 can be determined based on a threshold strength level of Wi-Fi signals received from the gateway 104. In such embodiments, the trusted zone 300 can be set up by physically moving a wireless mobile device around the desired boundaries of the trusted zone 300 and periodically reporting the strength of the Wi-Fi signal received by the mobile device from the gateway 104. By way of a non-limiting example, a field engineer, customer, or other user can carry a client device 102, such as a trusted authenticator 202 or other specialized client device 102, around the edges of a desired trusted zone 300. As the client device 102 is moved around the boundaries of the trusted zone 300, it can periodically measure the received signal strength and report the measured signal strength level at its current location to the gateway 104 using received signal strength indicator (RSSI) data according to 802.11k or another wireless protocol. The gateway 104 can use the reported signal strength levels to determine a threshold trusted zone signal strength, such that devices receiving the gateway's Wi-Fi signal at levels at or above the threshold trusted zone signal strength can be considered to be within the trusted zone 300, while devices receiving the gateway's Wi-Fi signal at levels lower than the threshold trusted zone signal strength can be considered to be outside the trusted zone 300. In some embodiments the gateway 104 can share the threshold trusted zone signal strength with trusted authenticators 202.

Figure 4:
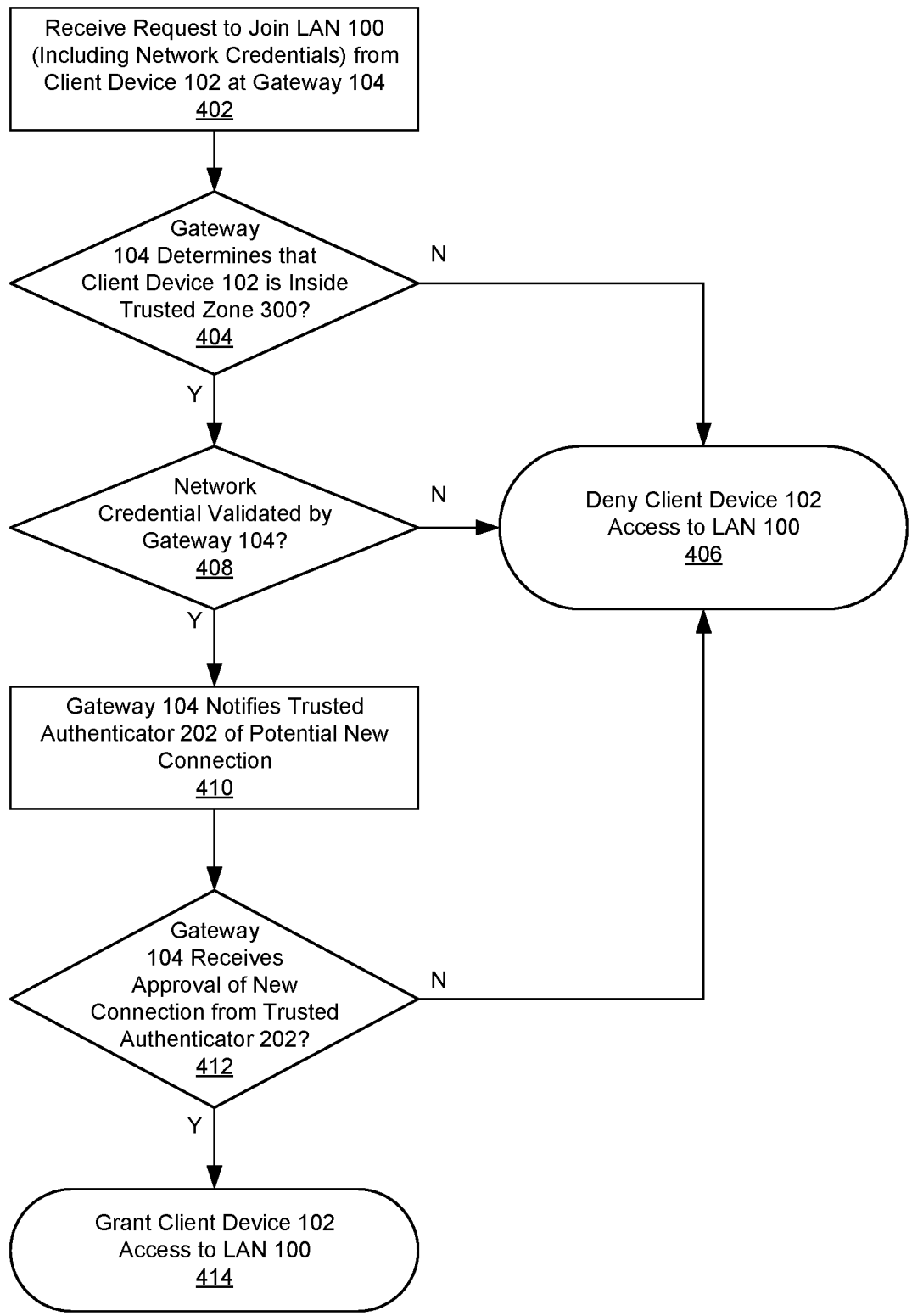
FIG. 4 depicts a first exemplary process for using a trusted authenticator to grant or deny a new client device access to a LAN.

FIG. 4 depicts a first exemplary process for using a trusted authenticator 202 to grant or deny a new client device 102 access to a LAN 100. In this exemplary process the new client device 102 can already have network credentials that it can attempt to use to join the LAN 100.

At step 402, the gateway 104 can wirelessly receive a request to join the LAN 100 from a new client device 102. The client device's request can include network credentials for accessing the LAN 100 wirelessly, such as a key used in security protocols such as WEP, WPA, or WPA2, or a digital certificate used in security protocols such as WPA-801.1x.

At step 404, the gateway 104 can determine whether the new client device 102 is inside or outside the borders of a trusted zone 300. In some embodiments the client device 102 can report the physical coordinates of its current location to the gateway 104, such as latitude and longitude coordinates measured by its internal GPS, and the gateway 104 can compare the client device's coordinates against the boundaries of the trusted zone 300 to determine whether or not the client device 102 is inside the trusted zone 300. In other embodiments the client device 102 can report a measurement of the strength of the Wi-Fi signal it received from the gateway 104, and the gateway 104 can compare the client device's received signal strength measurement against the threshold trusted zone signal strength to determine whether or not the client device 102 is inside the trusted zone 300. In some embodiments the client device's initial request to join the LAN 100 can include its physical coordinates and/or signal strength measurement, while in other embodiments the gateway 104 can prompt the client device 102 to report that information after it receives the initial request from the client device 102.

If the gateway 104 determines that the client device 102 is outside the trusted zone 300, the gateway 104 can deny the new client device 102 access to the LAN 100 at step 406 and the process can end. However, if the gateway 104 determines that the client device 102 is inside the trusted zone 300, the gateway 104 can move to step 408.

At step 408, the gateway 104 can attempt to validate the network credentials provided by the new client device 102. By way of a non-limiting example, the gateway 104 can verify that a provided digital key is the correct digital key for accessing the LAN 100, or that a provided digital certificate is the correct digital certificate previously issued to that client device 102. If the gateway 104 does not validate the provided network credentials, the gateway 104 can deny the new client device 102 access to the LAN 100 at step 406 and the process can end. However, if the gateway 104 does validate the provided network credentials, the gateway 104 can notify trusted authenticators 202 of the potential new connection at step 410.

At step 412, a trusted authenticator 202 can approve or deny the new connection with the new client device 102. In some embodiments, when multiple client devices 102 have been designated as trusted authenticators 202, any trusted authenticator 202 can approve or deny the new connection. Until a trusted authenticator 202 response with an approval of the new connection, the new client device 102 can be denied access to the LAN 100. If a trusted authenticator 202 responds to the gateway 104 with a denial of the new connection, the gateway 104 can deny the new client device 102 access to the LAN 100 at step 406 and the process can end. However, if a trusted authenticator 202 responds to the gateway 104 with an approval of the new connection, the gateway 104 can grant the new client device 102 access to the LAN 100 at step 414, and the client device 102 can begin sending and receiving data wirelessly via the LAN 100.

In some embodiments steps 404 and 408 can be performed in the opposite order, such that the gateway 104 verifies network credentials provided by the new client device 102 before verifying that it is in the trusted zone 300. In alternate embodiments one or both of steps 404 and 408 can be absent or skipped. By way of a non-limiting example, step 404 can be skipped in embodiments or situations in which a trusted zone 300 has not been set up, while a gateway 104 can be configured to skip step 408 such that a new client device 102 can be approved by a trusted authenticator 202 without the new client device 102 providing network credentials.

Figure 5:
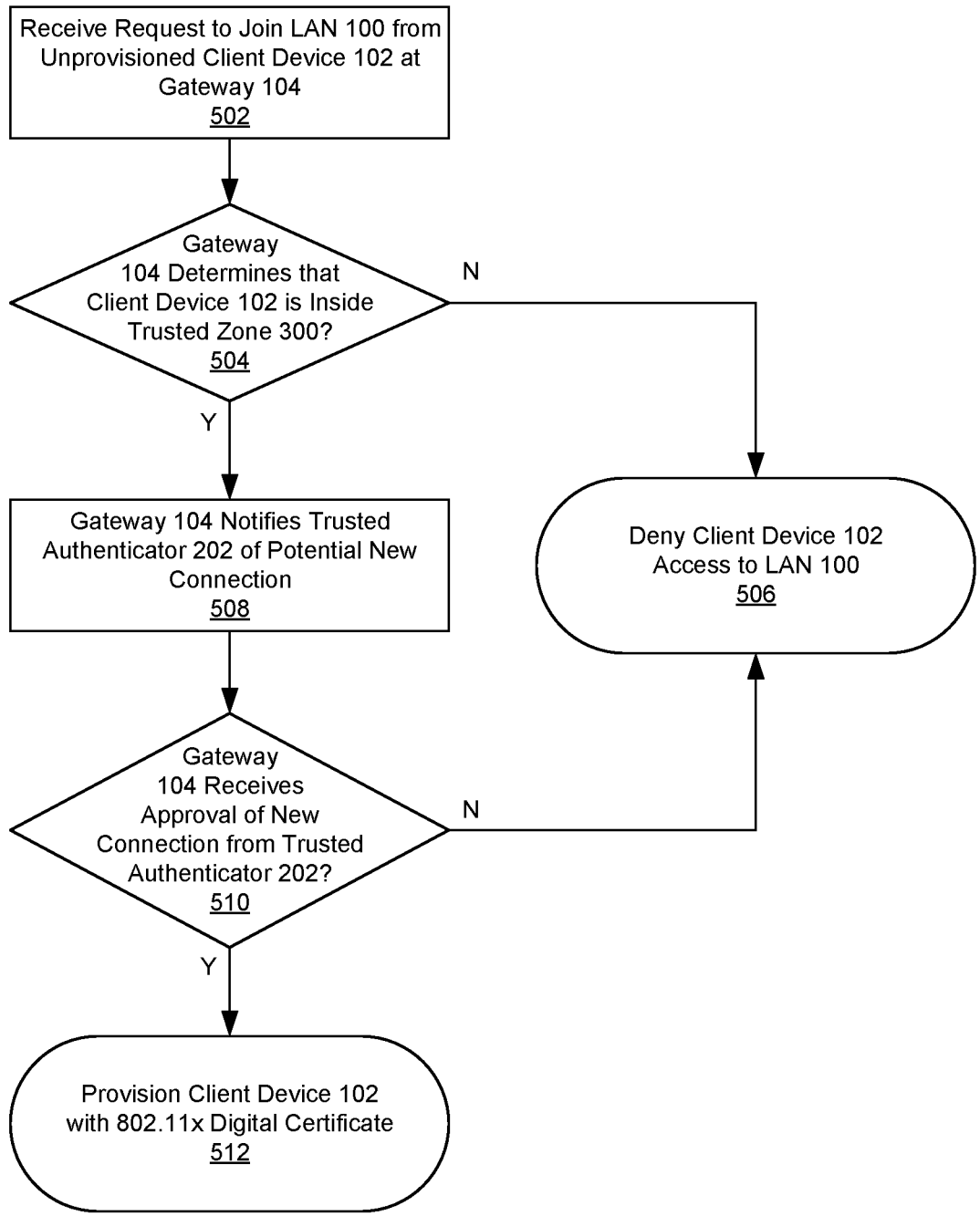
FIG. 5 depicts a second exemplary process for using a trusted authenticator to grant or deny a new client device access to a LAN.

FIG. 5 depicts a second exemplary process for using a trusted authenticator 202 to grant or deny a new client device 102 access to a LAN 100. In this embodiment the gateway 104 can be set to protect the LAN 100 using a security protocol such as WPA-801.1x in which the gateway 104 verifies a digital certificate before granting access to a client device 102. In the exemplary process of FIG. 5 the new client device 102 can initially lack such a digital certificate, however if the new client device 102 is approved it can be provisioned with a digital certificate to allow it to connect to the LAN 100 in the future.

At step 502, the gateway 104 can wirelessly receive a request to join the LAN 100 from a new client device 102. As described above, the new client device 102 may not yet be provisioned with a digital certificate for a security protocol such as WPA-801.1x.

At step 504, the gateway 104 can determine whether the new client device 102 is inside or outside the borders of a trusted zone 300. In some embodiments the client device 102 can report the physical coordinates of its current location to the gateway 104, such as latitude and longitude coordinates measured by its internal GPS, and the gateway 104 can compare the client device's coordinates against the boundaries of the trusted zone 300 to determine whether or not the client device 102 is inside the trusted zone 300. In other embodiments the client device 102 can report a measurement of the strength of the Wi-Fi signal it received from the gateway 104, and the gateway 104 can compare the client device's received signal strength measurement against the threshold trusted zone signal strength to determine whether or not the client device 102 is inside the trusted zone 300. In some embodiments the client device's initial request to join the LAN 100 can include its physical coordinates and/or signal strength measurement, while in other embodiments the gateway 104 can prompt the client device 102 to report that information after it receives the initial request from the client device 102.

If the gateway 104 determines that the client device 102 is outside the trusted zone, the gateway 104 can deny the new client device 102 access to the LAN 100 at step 506 and the process can end. However, if the gateway 104 determines that the client device 102 is inside the trusted zone, the gateway 104 can notify trusted authenticators 202 of the potential new connection at step 508.

At step 510, a trusted authenticator 202 can approve or deny the new connection with the new client device 102. In some embodiments, when multiple client devices 102 have been designated as trusted authenticators 202, any trusted authenticator 202 can approve or deny the new connection. Until a trusted authenticator 202 response with an approval of the new connection, the new client device 102 can remain unprovisioned with a digital certificate and can thus be denied access to the LAN 100. If a trusted authenticator 202 responds to the gateway 104 with a denial of the new connection, the gateway 104 can deny the new client device 102 access to the LAN 100 at step 506 and the process can end. However, if a trusted authenticator 202 responds to the gateway 104 with an approval of the new connection, the gateway 104 can provision the new client device 102 with a digital certificate, such as a WPA-801.1x digital certificate.

Following the steps of FIG. 5, after a client device 102 has been provisioned with a digital certificate, the client device 102 can use the digital certificate to join the LAN 100. In some embodiments or situations, the client device 102 can use the digital certificate to join the LAN 100 directly within a predetermined period of time following the initial provisioning of the digital certificate, as during the steps of FIG. 5 the gateway 104 can have already verified that the client device 102 is within the trusted zone 300 and the new client device 102 can have already been approved by a trusted authenticator 202. However, if the client device 102 does not connect to the LAN 100 with the newly provisioned digital certificate within the predetermined period of time or disconnects from the LAN 100, the client device's next attempt to join the LAN 100 can be granted or denied using the steps of FIG. 4 because the client device 102 now has a digital certificate it can provide for verification during step 408.

In some embodiments steps 404 and 408 can be performed in the opposite order, such that the gateway 104 verifies network credentials provided by the new client device 102 before verifying that it is in the trusted zone 300. In alternate embodiments one or both of steps 404 and 408 can be absent or skipped. By way of a non-limiting example, step 404 can be skipped in embodiments or situations in which a trusted zone 300 has not been set up, while a gateway 104 can be configured to skip step 408 such that a new client device 102 can be approved by a trusted authenticator 202 without the new client device 102 providing network credentials.

Figure 6:
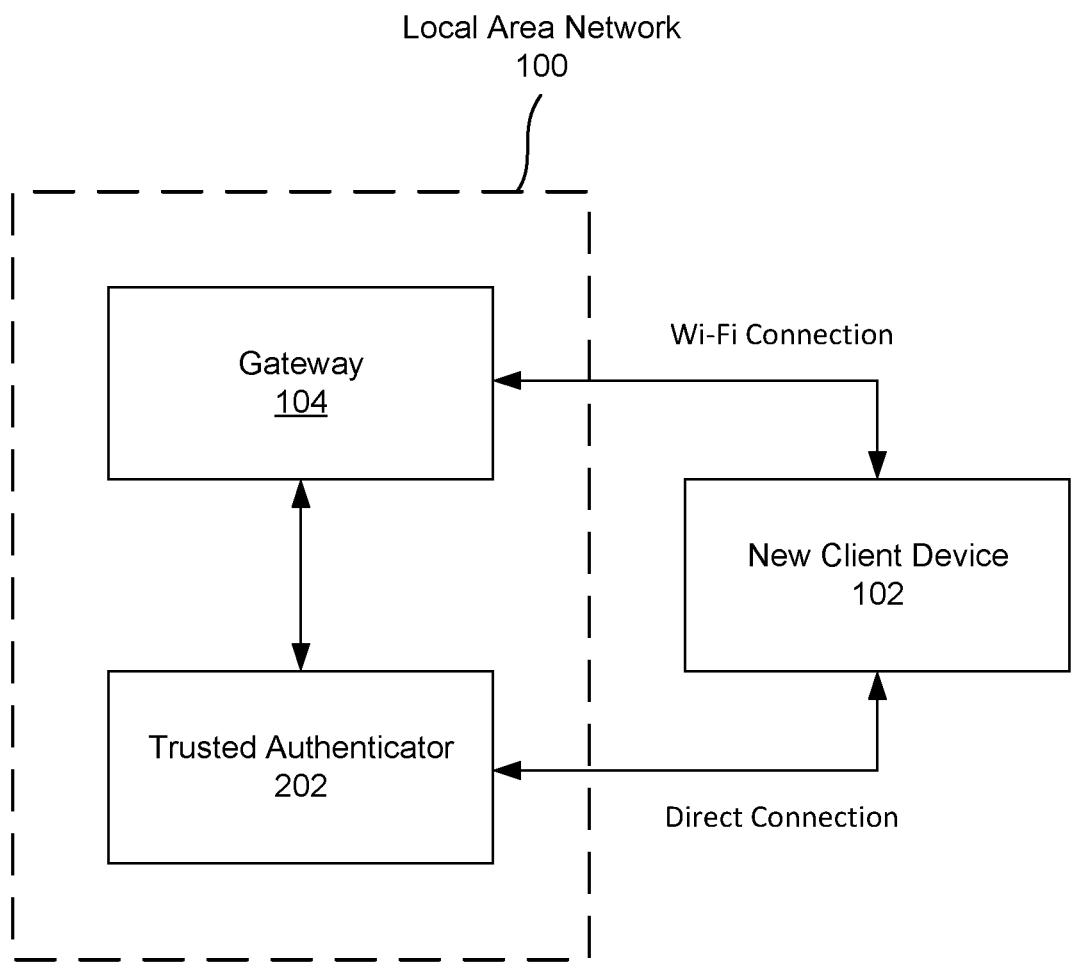
FIG. 6 depicts an embodiment in which a new client device and a trusted authenticator can establish a direct connection using near field communication (NFC), Bluetooth, or another type of direct connection without passing data through the gateway.

FIG. 6 depicts an embodiment in which a new client device 102 and a trusted authenticator 202 can establish a direct connection using near field communication (NFC), Bluetooth, or another type of direct connection without passing data through the gateway 104. In some embodiments the direct connection can be secured and/or encrypted, such as an NFC connection using a secure channel, or an encrypted Bluetooth connection.

In this embodiment the trusted authenticator 202 can be connected to the gateway 104 over a Wi-Fi connection. By way of a non-limiting example, the trusted authenticator 202 can already be provisioned with a digital certificate that it can use to access the LAN 100. However, in this embodiment the new client device 102 can initially lack a digital certificate or other network credential that is needed to connect the client device 102 to the gateway 104 and join the LAN 100. The new client device 102 can directly connect to the trusted authenticator 202 and use the trusted authenticator 202 as an intermediary to gain network credentials from the gateway 104, such that the new client device 102 can use the network credentials to join the LAN 100 via the gateway 104.

Figure 7:
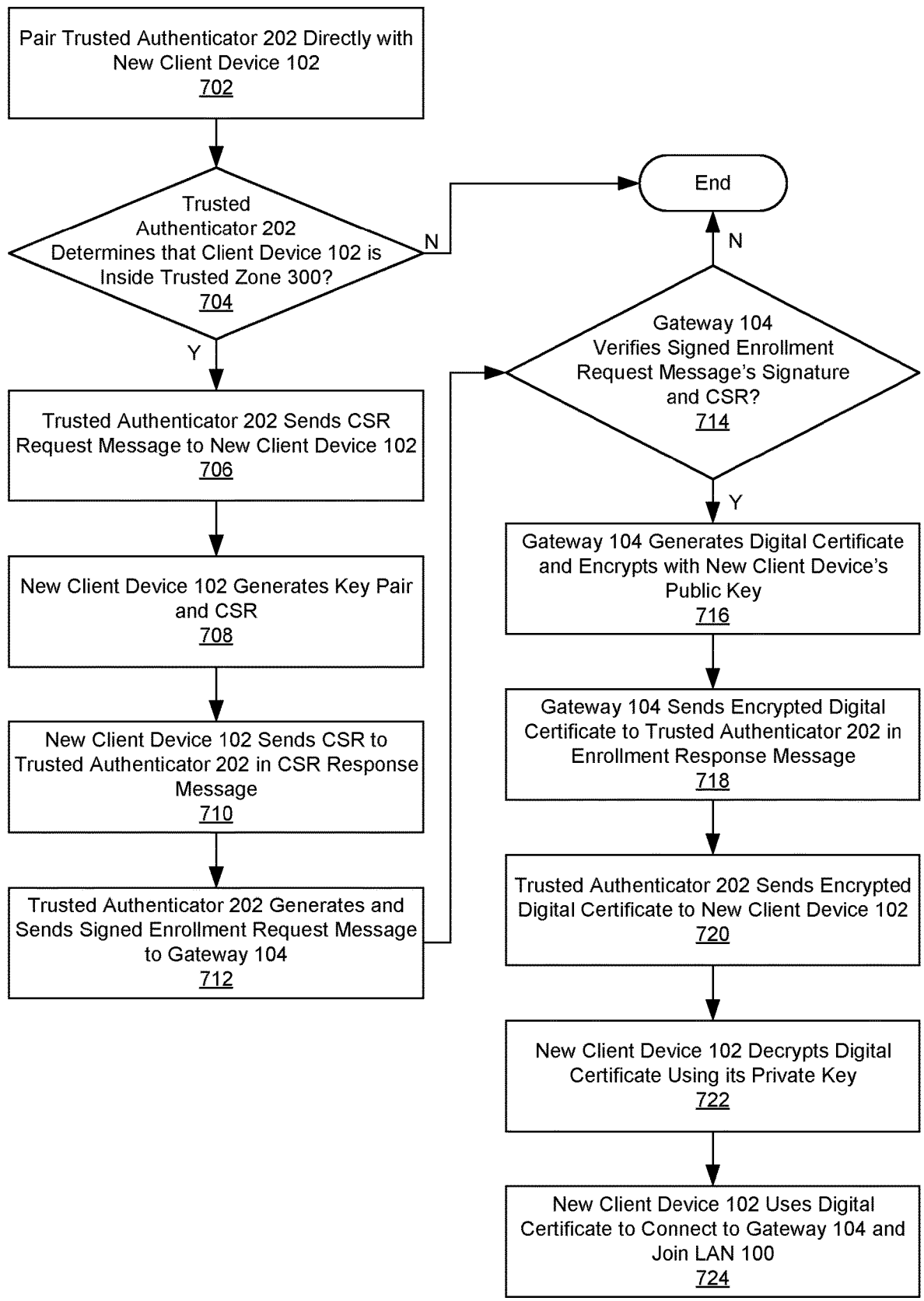
FIG. 7 depicts an exemplary process for provisioning a new client device with a digital certificate for accessing a LAN via a direct connection with a trusted authenticator.

FIG. 7 depicts an exemplary process for provisioning a new client device 102 with a digital certificate for accessing the LAN 100 via a direct connection with a trusted authenticator 202.

At step 702, a direct connection between the new client device 102 and a trusted authenticator 202 can be established by pairing the devices. By way of a non-limiting example, the new client device 102 and a trusted authenticator 202 can be paired using an NFC or Bluetooth connection, as described above with respect to FIG. 6.

At step 704, the trusted authenticator 202 can determine whether the new client device 102 is inside or outside the borders of a trusted zone 300. The gateway 104 can share information about the boundaries of the trusted zone 300 with the trusted authenticator 202 so that the trusted authenticator 202 can make that determination. In some embodiments the client device 102 can report the physical coordinates of its current location to the trusted authenticator 202, such as latitude and longitude coordinates measured by its internal GPS, and the trusted authenticator 202 can compare the client device's coordinates against the boundaries of the trusted zone 300 to determine whether or not the client device 102 is inside the trusted zone 300. In other embodiments the client device 102 can report a measurement of the strength of a Wi-Fi signal it received from the gateway 104 to the trusted authenticator 202. The trusted authenticator 202 can compare the client device's received signal strength measurement against a threshold trusted zone signal strength to determine whether or not the client device 102 is inside the trusted zone 300.

If the trusted authenticator 202 determines that the client device 102 is outside the trusted zone, the process can end. However, if the trusted authenticator 202 determines that the client device 102 is inside the trusted zone, the process can continue at step 706. In some alternate embodiments step 704 can be skipped. By way of a non-limiting example, step 704 can be skipped in embodiments or situations in which a trusted zone 300 has not been set up.

At step 706, the trusted authenticator 202 can send a certificate signing request (CSR) request message to the new client device 102. The CSR request message can identify a key pair generation algorithm, a certificate validity time, and information about the gateway's authentication server.

At step 708, after the new client device 102 receives the CSR request message, the new client device 102 can generate a key pair and a CSR. The key pair can comprise a private key and a public key, which the new client device 102 can generate according to the key pair generation algorithm identified in the CSR request message. After the public key is generated, the client device 102 can include the public key in the CSR along with identifying information about the client device 102. The generated private key can be used to sign the CSR, and the private key can be stored in a trusted data environment at the client device 102.

At step 710, the new client device can send the generated CSR to the trusted authenticator 202 in a CSR response message.

At step 712, the trusted authenticator 202 can extract the client device's CSR from the received CSR response message. The trusted authenticator 202 can generate an enrollment request message that includes the client device's CSR. In some embodiments the enrollment request message can be an SCEP (Simple Certificate Enrollment Protocol) message. In other embodiments the enrollment request message can be any other type of message that includes the CSR. The trusted authenticator 202 can sign the enrollment request message using its own private key, and then send the signed enrollment request message to the gateway 104.

At step 714, the gateway's authentication server can verify the enrollment request message's signature using a public key corresponding to the trusted authenticator's private key. The gateway's authentication server can also extract the new client device's CSR from the enrollment request message and verify the validity of the CSR. If the gateway 104 does not verify the signature of the enrollment request message or the client device's CSR, the process can end. However, if the gateway 104 does verify the signature of both the enrollment request message and the client device's CSR, the process can move to step 716.

At step 716, the gateway's authentication server can generate a digital certificate for the new client device 102 based on the client device's CSR. As described above, the digital certificate can be a network credential that can be verified to provide the new client device 102 access to the LAN 100 via the gateway 104, such as a WPA-802.1x digital certificate. The gateway's authentication server can extract the client device's public key from the CSR, and use the client device's public key to encrypt the new digital certificate.

At step 718, the gateway 104 can send the encrypted digital certificate to the trusted authenticator 202 in an enrollment response message. In some embodiments the enrollment response message can be an SCEP (Simple Certificate Enrollment Protocol) message. In other embodiments the enrollment response message can be any other type of message that includes the encrypted digital certificate.

At step 720, the trusted authenticator 202 can extract the encrypted digital certificate from the enrollment response message. The trusted authenticator 202 can be prevented from accessing the digital certificate itself due to the encryption based on the new client device's public key, as the trusted authenticator 202 does not have a copy of the new client device's private key. The trusted authenticator 202 can send the encrypted digital certificate to the new client device 102 via their direct connection.

At step 722, the new client device 102 can decrypt the encrypted digital certificate using its private key generated during step 708. The new client device 102 can store the decrypted digital certificate in a trusted data location.

At step 724, the new client device 102 can join the LAN 100 by providing the digital certificate to the gateway 104. In some embodiments or situations, the client device 102 can use the digital certificate to join the LAN 100 directly within a predetermined period of time following the initial provisioning of the digital certificate, as during the steps of FIG. 7 the trusted authenticator 202 can have already verified that the client device 102 is within the trusted zone 300. However, if the client device 102 does not connect to the LAN 100 with the newly provisioned digital certificate within the predetermined period of time or disconnects from the LAN 100, the client device's next attempt to join the LAN 100 can be granted or denied using the steps of FIG. 4 because the client device 102 now has a digital certificate it can provide for verification during step 408.

As shown in FIG. 7, the new client device 102 generates its own private key, and that private key is never sent to any other device. As such, the digital certificate returned to the new client device 102 cannot be readily used by any other device to gain access to the LAN 100.

In some embodiments, the trusted authenticator 202 and/or new client device 102 can be loaded with an application, SDK, or other software that is configured to perform the activities described above, such as exchanging messages and data over their direct connection or generating the key pair and CSR at the client device 102 during step 708.

Figure 8:
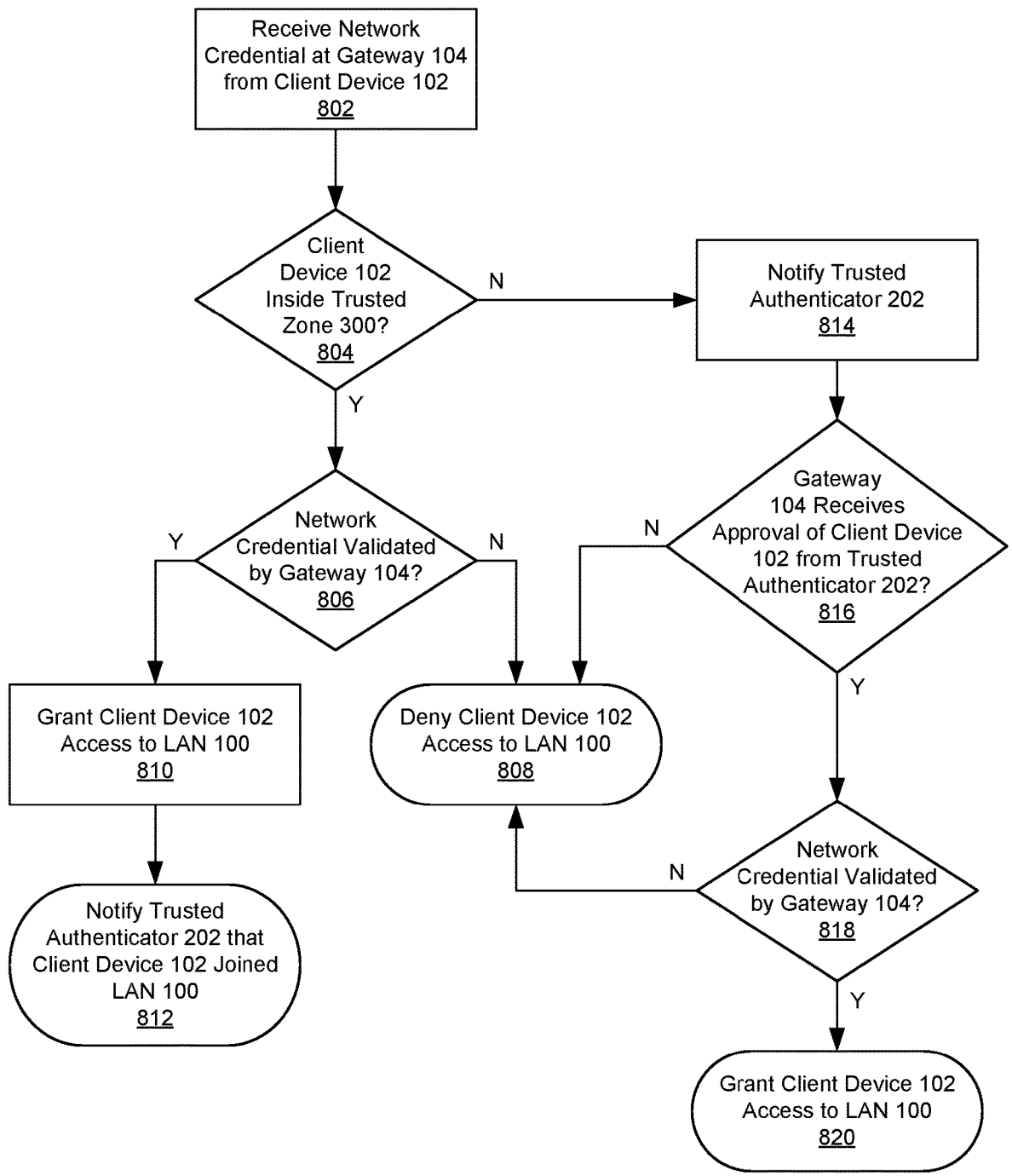
FIG. 8 depicts an alternate embodiment of process for granting or denying a new client device access to a LAN.

FIG. 8 depicts an alternate embodiment of process for granting or denying a new client device 102 access to a LAN 100. In this embodiment, new client devices 102 that are present within a trusted zone 300 can be granted access to the LAN 100 if they provide proper network credentials, while new client devices 102 that are outside the trusted zone 300 can still join the LAN 100 if they provide the proper network credentials and are also approved by a trusted authenticator 202.

At step 802, the gateway 104 can wirelessly receive a request to join the LAN 100 from a new client device 102. The client device's request can include network credentials for accessing the LAN 100 wirelessly, such as a key used in security protocols such as WEP, WPA, or WPA2, or a digital certificate used in security protocols such as WPA-801.1x.

At step 804, the gateway 104 can determine whether the new client device 102 is inside or outside the borders of a trusted zone 300. In some embodiments the client device 102 can report the physical coordinates of its current location to the gateway 104, such as latitude and longitude coordinates measured by its internal GPS, and the gateway 104 can compare the client device's coordinates against the boundaries of the trusted zone 300 to determine whether or not the client device 102 is inside the trusted zone 300. In other embodiments the client device 102 can report a measurement of the strength of the Wi-Fi signal it received from the gateway 104, and the gateway 104 can compare the client device's received signal strength measurement against the threshold trusted zone signal strength to determine whether or not the client device 102 is inside the trusted zone 300. In some embodiments the client device's initial request to join the LAN 100 can include its physical coordinates and/or signal strength measurement, while in other embodiments the gateway 104 can prompt the client device 102 to report that information after it receives the initial request from the client device 102.

If at step 804 the gateway 104 determines that the client device 102 is inside the trusted zone 300, the gateway 104 can attempt to validate the network credentials provided by the new client device 102 at step 806. By way of a non-limiting example, the gateway 104 can verify that a provided digital key is the correct digital key for accessing the LAN 100, or that a provided digital certificate is the correct digital certificate previously issued to that client device 102. If the gateway 104 does not validate the provided network credentials, the gateway 104 can deny the new client device 102 access to the LAN 100 at step 808 and the process can end.

However, if the gateway 104 does validate the provided network credentials during step 806, the gateway 104 can grant the new client device 102 access to the LAN 100 at step 810. The gateway 104 can also notify the trusted authenticators of the client device's new connection to the LAN 100 at step 812.

Returning to step 804, if the gateway 104 determines that the client device 102 is outside the trusted zone 300, the gateway 104 can notify trusted authenticators 202 of the potential new connection at step 814.

At step 816, a trusted authenticator 202 can approve or deny the new connection with the new client device 102. In some embodiments, when multiple client devices 102 have been designated as trusted authenticators 202, any trusted authenticator 202 can approve or deny the new connection. Until a trusted authenticator 202 response with an approval of the new connection, the new client device 102 can be denied access to the LAN 100. If a trusted authenticator 202 responds to the gateway 104 with a denial of the new connection, the gateway 104 can deny the new client device 102 access to the LAN 100 at step 808 and the process can end. However, if a trusted authenticator 202 responds to the gateway 104 with an approval of the new connection, the gateway 104 can move to step 818.

At step 818, after the new client device 102 outside the trusted zone 300 has been approved by a trusted authenticator 202, the gateway 104 can attempt to validate the network credentials provided by the new client device 102. If the gateway 104 does not validate the provided network credentials, the gateway 104 can deny the new client device 102 access to the LAN 100 at step 818 and the process can end, despite the trusted authenticator's approval. However, if the gateway 104 does validate the provided network credentials, the gateway 104 can grant the new client device 102 access to the LAN 100 at step 820, and the client device 102 can begin sending and receiving data wirelessly via the LAN 100.

Figure 9:
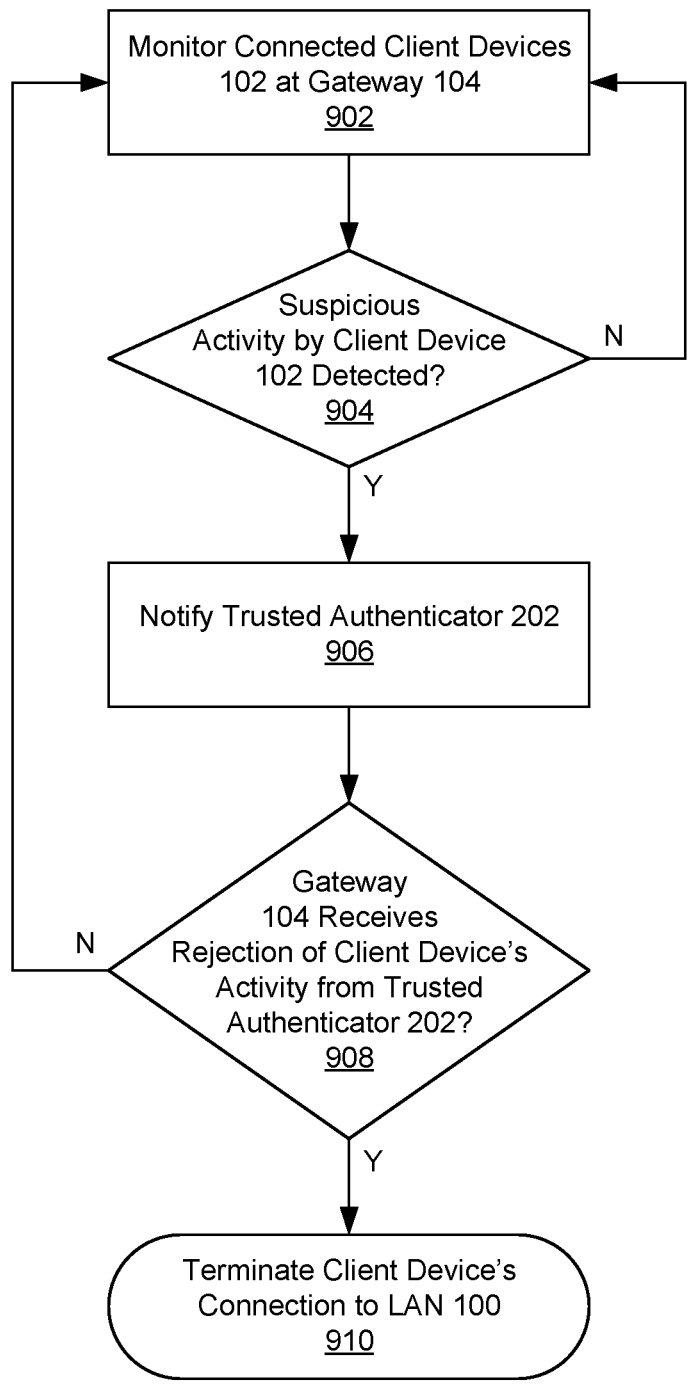
FIG. 9 depicts a process for approving or denying the activity of client devices with trusted authenticators after the client devices are connected to a LAN 100.

FIG. 9 depicts a process for approving or denying the activity of client devices 102 with trusted authenticators 202 after the client devices 102 are connected to a LAN 100.

At step 902, the gateway 104 can monitor the network traffic passing through it to and/or from each client device 102 connected to the LAN 100. By way of non-limiting examples, the gateway 104 can monitor the origin and/or destination of data packets passing through the gateway 104, the average and/or total amount of data sent or received by each client device 102 during a period of time, and/or any other metric regarding the traffic over the LAN 100.

At step 904, the gateway 104 can analyze the network traffic and determine if any suspicious activity is detected. Suspicious activity can include security and/or bandwidth usage issues, such as a client device 102 downloading more data than a predefined threshold level over a period of time, unauthorized attempts to connect to a client device 102 in the LAN 100, unauthorized attempts from one client device in the LAN 100 to access data on another client device 102 in the LAN 100, and/or any type of activity that has been designated as unauthorized or suspicious. If no suspicious activity is detected, the gateway 104 can continue monitoring the network traffic. However, when suspicious activity is detected at step 904, the gateway 104 can notify the trusted authenticators 202 at step 906. The notice to the trusted authenticators 202 can include a description of the problem and identify the client device 102 at issue.

In some embodiments the gateway 104 can periodically send synchronous notifications to trusted authenticators 202 that describe the recent activity of other client devices 102 connected to the LAN 100. When suspicious activity by a client device 102 is detected by the gateway 104, a description of that suspicious activity can be included in a regular synchronous notification to the trusted authenticators 202. In other embodiments the gateway 104 can send an asynchronous notification to trusted authenticators 202 upon discovery of suspicious behavior by a client device 102. In some embodiments when the gateway 104 sends a synchronous or asynchronous notification of suspicious activity, the gateway 104 can temporarily halt network traffic to and/or from the client device 102 until a trusted authenticator 202 responds to the notification. In other embodiments when the gateway 104 sends a synchronous or asynchronous notification of suspicious activity, the gateway 104 can allow the suspicious network activity to continue until a trusted authenticator 202 responds and rejects the activity.

After the trusted authenticators 202 have received a notice of suspicious activity regarding a client device 102, any of the trusted authenticators 202 can approve or deny the activity by sending a return message to the gateway 104. If one of the trusted authenticators 202 approves the activity, the gateway 104 can continue monitoring network traffic but ignore the suspicious activity. In some embodiments the gateway 104 can ignore the suspicious activity for a predetermined period of time or a period of time set by the approving trusted authenticator 202, after which time it can again notify the trusted authenticators 202 if the suspicious activity persists.

However, if one of the trusted authenticators 202 returns a message that does not approve the suspicious activity, at step 910 the gateway 104 can terminate the LAN connection of the client device 102 at issue. The client device 102 can be denied access to the LAN 100 until it again provides the proper network credentials and/or approved by a trusted authenticator 202.

By way of a non-limiting example, when the gateway 104 determines that a connected client device 102 is downloading more data over the LAN 100 than a preset quota level, it can notify trusted authenticators 202 on the LAN 100. While the client device 102 might be downloading a large file legitimately, it might also be that an unauthorized user has gained access to the LAN 100 and is using it to download pirated movie files. As such, the gateway 104 can notify trusted authenticators 202 of the client device's suspicious behavior so that a user of the trusted authenticator 202 can investigate the situation and either approve or deny the activity.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

The invention claimed is:

1. A method of granting access to a wireless network, comprising:
   pairing a trusted authenticator directly with a client device over a direct connection to enable the client device to become connected to a WLAN, wherein the direct connection is a near field connection (NFC) or a Bluetooth connection, and wherein said trusted authenticator is connected to a gateway over a Wireless Local Area Network (WLAN) Wi-Fi wireless network and is loaded with trusted zone information defining boundaries of a predefined trusted zone associated with said gateway;
   determining with said trusted authenticator whether said client device is within said trusted zone based on said trusted zone information, and denying said client device access to said wireless network when said client device is outside said trusted zone;
   sending a certificate signing request (CSR) request message from said trusted authenticator to said client device, said CSR request message defining a key pair generation algorithm;
   receiving a CSR at said trusted authenticator from said client device in response to said CSR request message, said CSR comprising a public key generated by said client device according to said key pair generation algorithm;
   sending said CSR from said trusted authenticator to said gateway in an enrollment request message;
   receiving a digital certificate from said gateway at said trusted authenticator in response to said enrollment request message, wherein said gateway generated a digital certificate based on said CSR and encrypted said digital certificate using said public key in said CSR; and
   providing said digital certificate from said trusted authenticator to said client device such that said client device decrypts said digital certificate using a private key generated at the client device according to said key pair generation algorithm and provides said digital certificate to an authentication server at said gateway to join said wireless network,
   wherein said trusted zone has boundaries defined by geographical coordinates of a building, said client device is determined to be within the geographical coordinates of the building when the client device is within the trusted zone as determined by the trusted authenticator, and
   wherein the client device is a video player.

2. The method of claim 1, wherein said trusted zone has boundaries defined by geographical coordinates, said client device reports geographical coordinates of its current location to said trusted authenticator, and said trusted authenticator compares said client device's geographical coordinates against the geographical coordinates of said trusted zone's boundaries to determine whether said client device is within said trusted zone.

3. The method of claim 1, wherein said trusted zone has boundaries that are defined by locations at which a wireless signal emitted by said gateway has a threshold strength level, said client device reports to said trusted authenticator a strength level at which it received said wireless signal from said gateway, and said trusted authenticator determines that said client device is within said trusted zone when the strength level reported by said client device is above said threshold strength level.

4. The method of claim 1, wherein said digital certificate is a WPA-802.1x digital certificate.

5. The method of claim 1, wherein said enrollment request message and said gateway's response to said enrollment request message are Simple Certificate Enrollment Protocol (SCEP) messages.

6. The method of claim 1, wherein the NFC connection is made over a secure channel between said trusted authenticator and said client device.

7. The method of claim 1, wherein said Bluetooth connection is made between said trusted authenticator and said client device.

* * * * *